(12) United States Patent
Gilbert et al.

(10) Patent No.: US 9,299,345 B1
(45) Date of Patent: Mar. 29, 2016

(54) BOOTSTRAPPING LANGUAGE MODELS FOR SPOKEN DIALOG SYSTEMS USING THE WORLD WIDE WEB

(75) Inventors: Mazin Gilbert, Warren, NJ (US); Dilek Z. Hakkani-Tur, Castro Valley, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 931 days.

(21) Appl. No.: 11/425,243

(22) Filed: Jun. 20, 2006

(51) Int. Cl.
*G10L 15/00* (2013.01)
*G10L 15/14* (2006.01)
*G10L 15/22* (2006.01)
*G10L 15/30* (2013.01)

(52) U.S. Cl.
CPC .............. *G10L 15/22* (2013.01); *G10L 15/30* (2013.01)

(58) Field of Classification Search
CPC .............. G06F 17/30864; G06F 17/30268; G06F 17/30705; G06F 17/3089; G06F 17/30592; G06F 17/30684; G06F 17/30997; G10L 15/26; G10L 15/08; G10L 15/1822; G10L 15/22; G10L 13/00; G10L 13/027
See application file for complete search history.

(56) References Cited

U.S. PATENT DOCUMENTS

| | | | | |
|---|---|---|---|---|
| 5,819,220 | A * | 10/1998 | Sarukkai et al. | 704/270.1 |
| 6,418,431 | B1 * | 7/2002 | Mahajan et al. | |
| 6,714,941 | B1 * | 3/2004 | Lerman et al. | 707/103 R |
| 7,043,422 | B2 * | 5/2006 | Gao et al. | 704/9 |
| 7,373,300 | B1 * | 5/2008 | Bangalore et al. | 704/270.1 |
| 2002/0087325 | A1 * | 7/2002 | Lee et al. | 704/270.1 |
| 2003/0004838 | A1 * | 1/2003 | Kusuda et al. | 705/27 |
| 2003/0200094 | A1 * | 10/2003 | Gupta et al. | 704/270.1 |
| 2004/0111264 | A1 * | 6/2004 | Wang et al. | 704/257 |
| 2005/0080614 | A1 * | 4/2005 | Bennett | 704/9 |
| 2005/0256715 | A1 * | 11/2005 | Okimoto et al. | 704/257 |
| 2006/0190253 | A1 * | 8/2006 | Hakkani-Tur et al. | 704/243 |
| 2008/0040114 | A1 * | 2/2008 | Zhou et al. | 704/257 |

OTHER PUBLICATIONS

Ivan Bulyko, Mari Ostendorf, Andreas Stolcke, Getting more mileage from web text sources for conversational speech language modeling using class-dependent mixtures, Proceedings of the 2003 Conference of the North American Chapter of the Association for Computational Linguistics on Human Language Technology: companion volume of the Proceedings of.*

Misu, T., Kawahara, T.: A bootstrapping approach for developing language model of new spoken dialogue systems by selecting Web texts. In: Proc. Interspeech, pp. 9-12 (2006).*

Ng, T.; Ostendorf, M.; Mei-Yuh Hwang; Manhung Siu; Bulyko, I.; Xin Lei, "Web-Data Augmented Language Models for Mandarin Conversational Speech Recognition," Acoustics, Speech, and Signal Processing, 2005. Proceedings. (ICASSP '05). IEEE International Conference on , vol. 1, No. pp. 589-592, Mar. 18-23, 2005.*

(Continued)

*Primary Examiner* — Michael Ortiz Sanchez

(57) ABSTRACT

A system, method and computer readable medium that generates a language model from data from a web domain is disclosed. The method may include filtering web data to remove unwanted data from the web domain data, extracting predicate/argument pairs from the filtered web data, generating conversational utterances by merging the extracted predicate/argument pairs into conversational templates, and generating a web data language model using the generated conversational utterances.

17 Claims, 3 Drawing Sheets

(56) References Cited

OTHER PUBLICATIONS

Hakkani-Tur, D.; Rahim, M., "Bootstrapping Language Models for Spoken Dialog Systems From the World Wide Web," Acoustics, Speech and Signal Processing, 2006. ICASSP 2006 Proceedings. 2006 IEEE International Conference on , vol. 1, no., pp. I-I, May 14-19, 2006.*

Xiaojin Zhu; Rosenfeld, R., "Improving trigram language modeling with the World Wide Web," Acoustics, Speech, and Signal Processing, 2001. Proceedings. (ICASSP '01). 2001 IEEE International Conference on , vol. 1, no., pp. 533-536 vol. 1, 2001.*

G. Di Fabbrizio, G. Tur, and D. Hakkani-Tr. Bootstrapping spoken dialog systems with data reuse. In Proceedings of 5th_SigDial Workshop on Discourse and Dialogue, Boston, MA, May 2004.*

E. Agichtein and L. Gravano. Snowball: Extracting Relations from Large Plain-Text Collections. In Proceedings of the 5th ACM International Conference on Digital Libraries, pp. 85-94, San Antonio, Texas, 2000.*

A. Blum and T. Mitchell. Combining Labeled and Unlabeled Data with Co-Training. In Proceedings of the 11th Annual Conference on Computational Learning Theory, pp. 92-100, Madison, Wisconsin, 1998.*

S. Brin. Extracting Patterns and Relations from the World Wide Web. In WebDB Workshop at 6th International Conference on Extending Database Technology, EDBT'98, pp. 172-183, Valencia, Spain, 1998.*

F Keller, M Lapata, Using the web to obtain frequencies for unseenbigrams, Computational Linguistics, 29:3(2003), 459-484.*

R. Iyer, M. Ostendorf, H. Gish, "Using Out-of-Domain Data to Improve In-Domain Language Models," IEEE Signal Processing letters, vol. 4, No. 8, pp. 221-223 (Aug. 1997).*

K. Weilhammer, M. N. Stuttle, and S. Young, 'Bootstrapping language models for dialogue systems', in Proceedings of Interspeech 2006, Pittsburgh, PA, (2006).*

Arasu, Arvind, and Hector Garcia-Molina. "Extracting structured data from web pages." Proceedings of the 2003 ACM SIGMOD.*

Surdeanu, Mihai, et al. "Using predicate-argument structures for information extraction." Proceedings of the 41st Annual Meeting on Association for Computational Linguistics-vol. 1. Association for Computational Linguistics, 2003.*

* cited by examiner

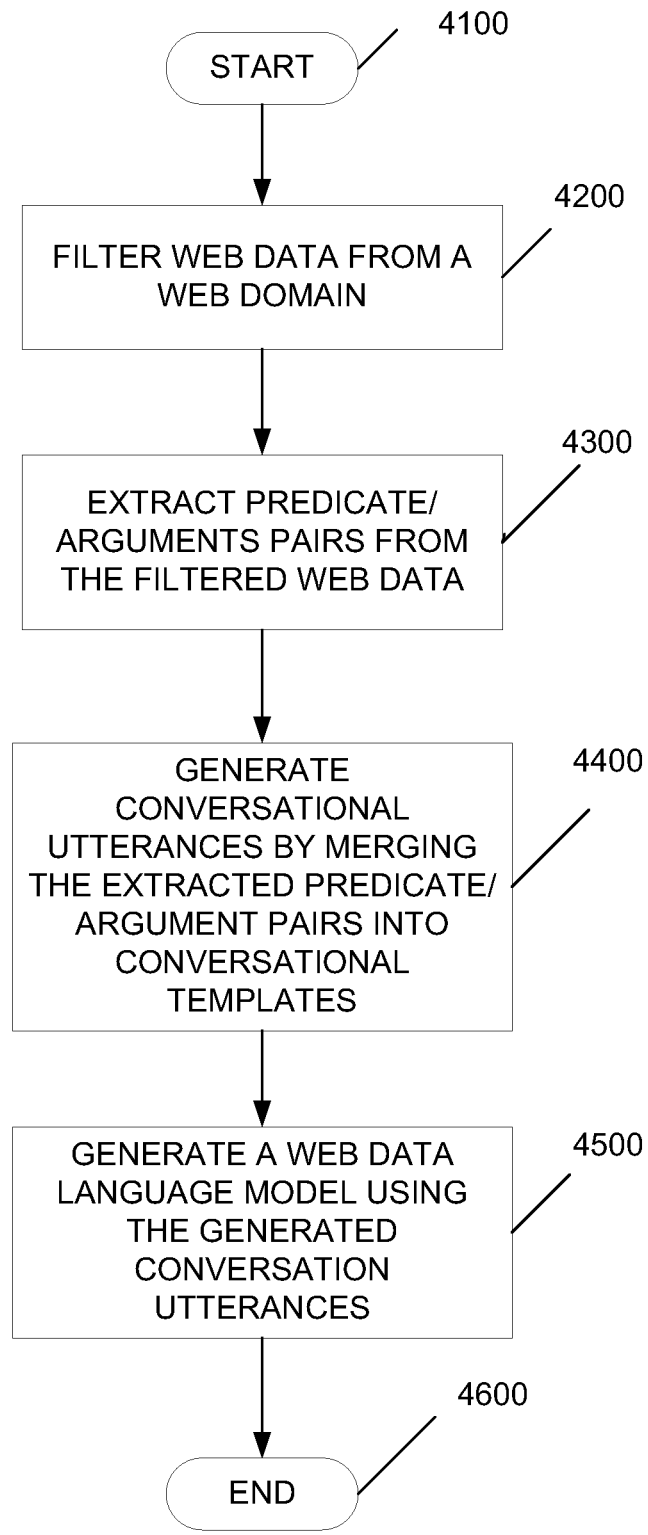

BOOTSTRAPPING LANGUAGE MODELS FOR SPOKEN DIALOG SYSTEMS USING THE WORLD WIDE WEB

BACKGROUND OF THE INVENTION

1. Field of the Invention

The present invention relates to a feature for use in speech recognition and understanding and more specifically, to a system and method of generating a language model using data from a web domain.

2. Introduction

One of the many challenges when creating statistical language models for voice-enabled automated call center attendant applications is collecting a sufficient amount of data to train the statistical language models and semantic classification models. This process is not only resource intensive but also delays the time-to-deployment of the application.

These challenges are ever-present when attempting train language models for automatic speech recognition (ASR) by utilizing the wealth of data from the World Wide Web ("the web" or "the internet"). Although the web may seem an ideal natural resource for creating language models, it is historically difficult to use since the statistics of the web language is vastly different than that observed in conversational style utterances. For example, the disfluencies, such as filled pauses or first/third person pronouns which are frequently observed in spoken language, are rarely observed in the web data. Instead, there are often web-specific word sequences, such as "click on the link," which never occur in spoken dialogs. Nevertheless, there is sufficiently useful in-domain information, such as key phrases, product names, and abbreviations that makes the web data a valuable resource for creating language models.

SUMMARY OF THE INVENTION

A system, method and computer readable medium that generates a language model from data from a web domain is disclosed. The method may include filtering web data to remove unwanted data from the web domain data, extracting predicate/argument pairs from the filtered web data, generating conversational utterances by merging the extracted predicate/argument pairs into conversational templates, and generating a web data language model using the generated conversational utterances.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 4 illustrates an exemplary flowchart illustrating the web data language model generator method in accordance with a possible embodiment of the invention.

DETAILED DESCRIPTION OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The present invention comprises a variety of embodiments, such as a system, method, computer-readable medium, and other embodiments that relate to the basic concepts of the invention.

Figure 1:
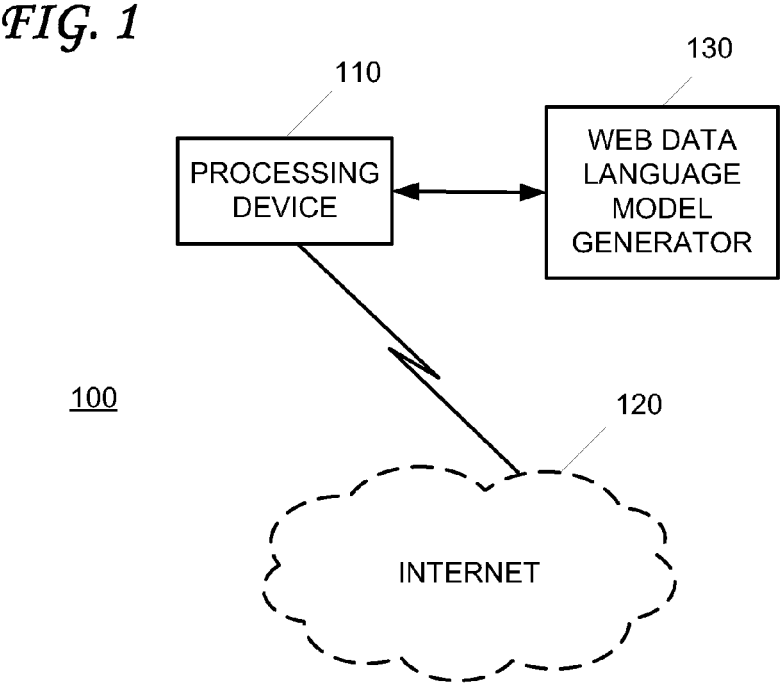
FIG. 1 illustrates an exemplary diagram of a network environment in accordance with a possible embodiment of the invention.

FIG. 1 illustrates an exemplary diagram of a network environment 100 in accordance with a possible embodiment of the invention. In particular, the network environment 100 includes processing device 110, internet 120 and web data language model generator 130.

One of skill in the art will appreciate that the network environment 100 may be any possible configuration in which a processing device may be accessible to the internet 120. While the internet 120 is illustrated, one of skill in the art will appreciate that the web data language model generation process discussed herein may be implemented in conjunction with other network systems, such as an intranet or any other network system capable of hosting domains containing web page data, for example.

Processing device 110 illustrated in FIG. 1 and its related discussion are intended to provide a brief, general description of a suitable computing environment in which the invention may be implemented. Although not required, the invention will be described, at least in part, in the general context of computer-executable instructions, such as program modules, being executed by a processing device 110, such as personal computer. Generally, program modules include routine programs, objects, components, data structures, etc. that perform particular tasks or implement particular abstract data types. Moreover, those skilled in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Figure 2:
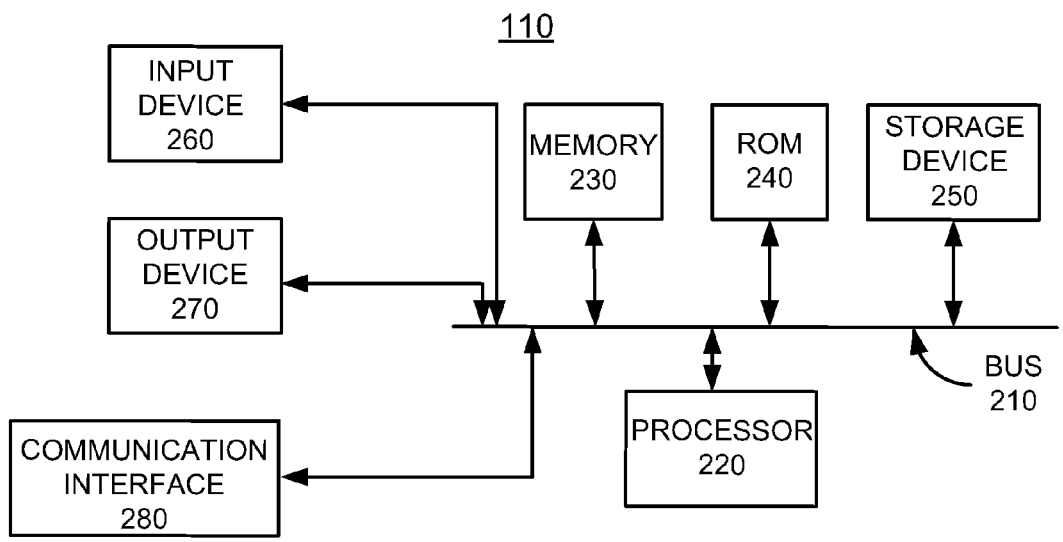
FIG. 2 illustrates an exemplary block diagram of a processing device for implementing the web data language model generation method in accordance with a possible embodiment of the invention.

FIG. 2 illustrates an exemplary processing device 110 which may implement one or more modules or functions of the web data language model generator 130 shown in FIG. 1. Thus, processing device 110 may include may include a bus 210, a processor 220, a memory 230, a read only memory (ROM) 240, a storage device 250, an input device 260, an output device 270, and a communication interface 280. Bus 210 may permit communication among the components of processing device 110.

Processor 220 may include at least one conventional processor or microprocessor that interprets and executes instructions. Memory 230 may be a random access memory (RAM) or another type of dynamic storage device that stores information and instructions for execution by processor 220. Memory 230 may also store temporary variables or other intermediate information used during execution of instructions by processor 220. ROM 240 may include a conventional ROM device or another type of static storage device that stores static information and instructions for processor 220. Storage device 250 may include any type of media, such as, for example, magnetic or optical recording media and its corresponding drive.

Input device 260 may include one or more conventional mechanisms that permit a user to input information to processing device 110, such as a keyboard, a mouse, a pen, a voice recognition device, etc. Output device 270 may include one or more conventional mechanisms that output information to the user, including a display, a printer, one or more speakers, or a medium, such as a memory, or a magnetic or optical disk and a corresponding disk drive. Communication interface 280 may include any transceiver-like mechanism that enables processing device 110 to communicate via a network. For example, communication interface 280 may include a modem, or an Ethernet interface for communicating via a local area network (LAN). Alternatively, communication interface 280 may include other mechanisms for communicating with other devices and/or systems via wired, wireless or optical connections. In some implementations of the network environment 100, communication interface 280 may not be included in processing device 110 when the web data language model generation process is implemented completely within a single processing device 110.

The processing device 110 may perform such functions in response to processor 220 by executing sequences of instructions contained in a computer-readable medium, such as, for example, memory 230, a magnetic disk, or an optical disk. Such instructions may be read into memory 230 from another computer-readable medium, such as storage device 250, or from a separate device via communication interface 280.

Figure 3:
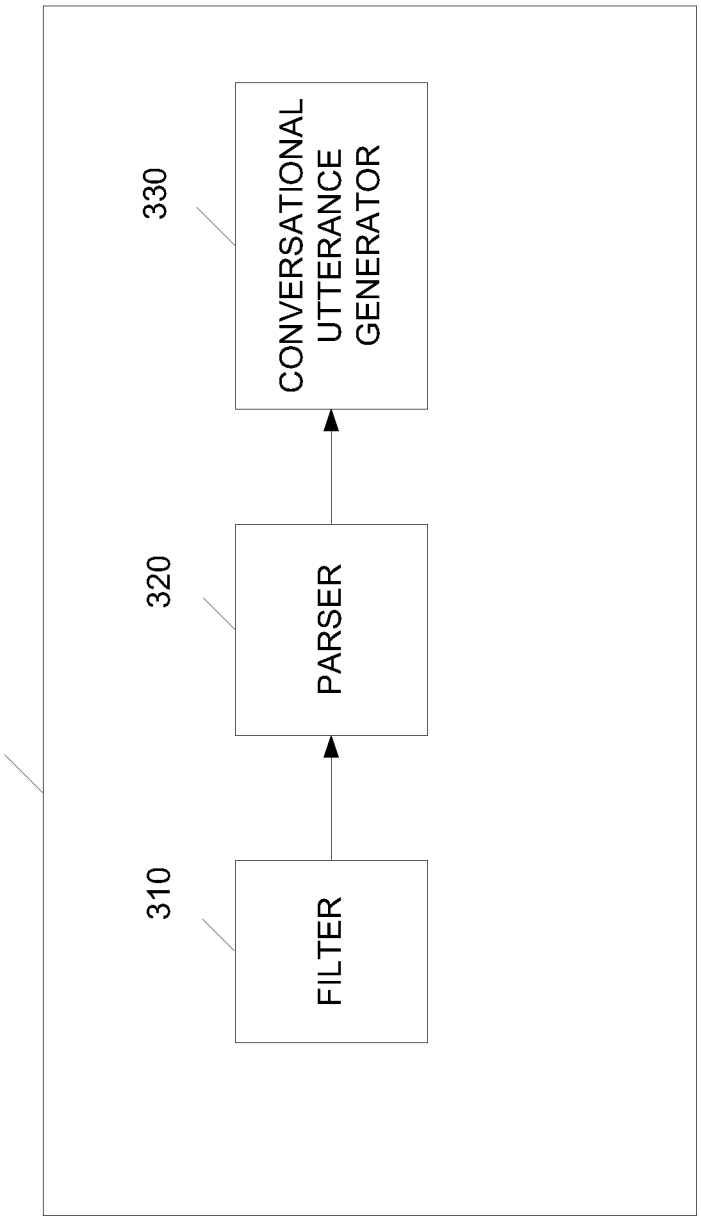
FIG. 3 illustrates an exemplary block diagram of an exemplary web data language model generator in accordance with a possible embodiment of the invention.

FIG. 3 is an exemplary block diagram of a possible embodiment of the web data language model generator 130 shown in FIG. 3. The web data language model generator 130 may include filter 310, parser 320, and conversational utterance generator 330. For illustrative purposes, the web data language model generation process will be described below in relation to the block diagrams shown in FIGS. 1, 2 and 3.

FIG. 4 is an exemplary flowchart illustrating some of the basic steps associated with a possible web data language model generation process in accordance with a possible embodiment of the invention. The process begins at step 4100 and continues to step 4200 where the filter 310 filters web data from a web domain. The filter 310 operates to remove unwanted or non-useful web data, such as the common task-independent sentences from the web text. For example, the filter 310 may filter the web data, W, so that the common task-independent web sentences (denoted by S), such as "Contact Us" or "Forgot your password?" are removed, forming the new set of sentences, Ŵ:

$$\hat{W} = W - S$$

The list of common web sentences can be obtained by taking the frequently occurring subset of sentences across multiple web sites.

In step 4300, parser 320 extracts predicate/argument pairs from the filtered web data. The parser 320 may use any parsing technique known to one of skill in the art to perform the extraction process such as semantic parsing, for example. For this purpose, the parser 320 parses all the sentences, and the predicates and arguments, P A, are extracted:

$$P A = \text{extract}_P A(\text{sem}_p \text{arse}(\hat{W}))$$

In step 4400, the conversational utterance generator 330 generates conversational utterances such as sentences or phrases, for example, by merging the extracted predicate/argument pairs into conversational templates:

$$N = CT \circ PA,$$

where CT is the set of conversational templates with their relative frequencies, and o is a special composition operation, which preserves the relative frequencies of the conversational templates.

Each conversational template is a sequence of words, with predicate and argument tokens. Some examples of conversational templates are:

uh [ARG0 I] would like to [PRED] [ARG1],
[ARG0 I] need to [PRED] [ARG1] please.

These templates can be either manually written or learned using utterances from other applications. These out-of-domain utterances can be semantically parsed, and the predicates and arguments can be replaced by the predicate and argument tokens. For example, an utterance like:

[ARG0 I] would like to [TARGET pay] [ARG1 my bill]

can be converted to the following template:

[ARG0 I] would like to [PRED] [ARG1].

Once all utterances are processed as described, the templates frequently occurring in multiple applications data can be used as domain-independent conversational templates with their relative frequencies.

In step 4500, the web data language model generator 130 generates a web data language model using the generated conversational utterances. The process goes to step 4600 and ends.

While the web data language model generator 130 uses learned domain-dependent conversational utterances using web pages related to the domain, these utterances may be used in combination with a library of utterances collected from previous applications, where applicable, to provide an initial language model for the an automated speech recognition (ASR) system. Once data is collected, unsupervised learning may be utilized to develop better language models for the domain. These models are used either during the ASR development or during deployment of the ASR service. Active learning may be used in which, based on available resources, domain-specific utterances are selectively transcribed to improve and update previously deployed language models. RAM, ROM, EEPROM, CD-ROM or other optical disk storage, magnetic disk storage or other magnetic storage devices, or any other medium which can be used to carry or store desired program code means in the form of computer executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. A "tangible" computer-readable medium expressly excludes a wireless or a carrier signal per an electromagnetic carrier signal per se.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the invention are part of the scope of this invention. For example, the principles of the invention may be applied to each individual user where each user may individually deploy such a system. This enables each user to utilize the benefits of the invention even if some or all of the conferences the user is attending do not provide the functionality described herein. In other words, there may be multiple instances of the system 110 in FIG. 1 each processing the content in various possible ways. It does not necessarily need to be one system used by all end users. Accordingly, the appended claims and their legal equivalents should only define the invention, rather than any specific examples given.

We claim:

1. A method comprising:
    identifying, via a processor communicating with Internet resources, common task independent web-sentences based on frequently occurring phrases across multiple websites from a web domain stored in a data store;
    selectively removing the common task independent web-sentences from the web domain data, to yield filtered web domain data comprising domain-specific data;
    identifying, via the processor, predicate/argument pairs from the filtered web domain data;
    replacing, via the processor, the predicate/argument pairs with predicate/argument tokens;
    generating, via the processor, conversational utterances by merging the predicate/argument tokens with manually written conversational templates while preserving a relative frequency of the manually written conversational templates, to yield generated conversational utterances; and
    generating, via the processor, a web data language model using the generated conversational utterances, and providing it as an initial language model for deployment of an automated speech recognition system.

2. The method of claim 1, wherein the predicates/argument pairs are identified by semantically parsing the filtered web domain data.

3. The method of claim 1, wherein the predicate/argument tokens are used to identify specific tasks.

4. The method of claim 1, wherein the conversational utterances are generated using manually written conversational templates according the relative frequency of occurrence.

5. The method of claim 1, wherein the conversational utterances are generated by merging the predicate/argument tokens into the manually written conversational templates in combination with using a library of previously collected utterances.

6. The method of claim 1, wherein the manually written conversational templates can be learned from a library of utterances from spoken dialogue systems.

7. A non-transitory computer-readable storage device having instructions stored which, when executed by a computing device connected to Internet resources, cause the computing device to perform operations-comprising:
    identifying, via a processor communicating with Internet resources, common task independent web-sentences based on frequently occurring phrases across multiple websites from a web domain stored in a data store;
    selectively removing the common task independent web-sentences from the web domain data, to yield filtered web domain data comprising domain-specific data;
    identifying, via the processor, predicate/argument pairs from the filtered web domain data;
    replacing, via the processor, the predicate/argument pairs with predicate/argument tokens;
    generating, via the processor, conversational utterances by merging the predicate/argument tokens with manually written conversational templates while preserving a relative frequency of the manually written conversational templates, to yield generated conversational utterances; and
    generating, via the processor, a web data language model using the generated conversational utterances, and providing it as an initial language model for deployment of an automated speech recognition system.

8. The non-transitory computer-readable storage device of claim 7, wherein the predicates/argument pairs are identified by semantically parsing the filtered web domain data.

9. The non-transitory computer-readable storage device of claim 7, wherein the predicate/argument tokens are used to identify specific tasks.

10. The non-transitory computer-readable storage device of claim 7, wherein the conversational utterances are generated using the manually written conversational templates according the relative frequency of occurrence.

11. The non-transitory computer-readable storage device of claim 7, wherein the conversational utterances are generated by merging the predicate/argument tokens into manually written conversational templates in combination with using a library of previously collected utterances.

12. The non-transitory computer-readable storage device of claim 7, wherein the manually written conversational templates can be learned from a library of utterances from spoken dialogue systems.

13. A system comprising:
a processor connected to Internet resources; and
a computer readable storage medium having instructions stored which, when executed by the processor, cause the processor to perform operations comprising:
identifying, via the processor communicating with Internet resources, common task independent web-sentences based on frequently occurring phrases across multiple websites from a web domain stored in a data store;
selectively removing the common task independent web-sentences from the web domain data, to yield filtered web domain data comprising domain-specific data;
identifying, via the processor, predicate/argument pairs from the filtered web domain data;
replacing, via the processor, the predicate/argument pairs with predicate/argument tokens;
generating, via the processor, conversational utterances by merging the predicate/argument tokens with manually written conversational templates while preserving a relative frequency of the manually written conversational templates, to yield generated conversational utterances; and
generating, via the processor, a web data language model using the generated conversational utterances, and providing it as an initial language model for deployment of an automated speech recognition system.

14. The system of claim 13, wherein the parser identifies predicates/argument pairs by semantically parsing the filtered web domain data.

15. The system of claim 13, wherein the conversational utterances are generated using the manually written conversational templates according the relative frequency of occurrence.

16. The system of claim 13, wherein the conversational utterances are generated by merging the predicate/argument tokens into manually written conversational templates in combination with using a library of previously collected utterances.

17. The system of claim 13, wherein the manually written conversational templates can be learned from a library of utterances from spoken dialogue systems.

* * * * *